US012610422B2

(12) United States Patent
Matsumura et al.

(10) Patent No.: US 12,610,422 B2
(45) Date of Patent: Apr. 21, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 323 days.

(21) Appl. No.: 18/552,800

(22) PCT Filed: Apr. 2, 2021

(86) PCT No.: PCT/JP2021/014368
§ 371 (c)(1),
(2) Date: Sep. 27, 2023

(87) PCT Pub. No.: WO2022/208880
PCT Pub. Date: Oct. 6, 2022

(65) Prior Publication Data
US 2024/0163956 A1 May 16, 2024

(51) Int. Cl.
*H04W 76/20* (2018.01)
*H04W 72/0446* (2023.01)
(Continued)

(52) U.S. Cl.
CPC ....... *H04W 76/20* (2018.02); *H04W 72/0446* (2013.01); *H04W 72/0453* (2013.01); *H04W 72/232* (2023.01); *H04W 72/566* (2023.01)

(58) Field of Classification Search
CPC . H04W 76/20; H04W 72/232; H04W 72/566; H04W 72/0446; H04W 72/0453
See application file for complete search history.

(56) References Cited

U.S. PATENT DOCUMENTS

2020/0045569 A1* 2/2020 Seo ........................ H04W 72/23
2020/0053757 A1* 2/2020 Bagheri ................ H04L 5/0053
(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2010 (149 pages).
(Continued)

*Primary Examiner* — Jael M Ulysse
(74) *Attorney, Agent, or Firm* — Osha Bergman Watanabe & Burton LLP

(57) ABSTRACT
A terminal according to one aspect of the present disclosure includes: a control section that determines a first control resource set (CORESET) to be preferentially monitored out of a plurality of CORESETs, based on a rule; and a receiving section that, when monitoring occasions of the first CORESET having one or more transmission configuration indication states (TCI states) and a second CORESET having one or more TCI states overlap, controls monitoring of a downlink control channel (PDCCH) in the second CORESET, based on the one or more TCI states of the first CORESET and the one or more TCI states of the second CORESET. According to one aspect of the present disclosure, collision of a plurality of downlink control channels can be appropriately addressed.

6 Claims, 11 Drawing Sheets

CORESET#X

TCI STATE #1

CORESET#Y

TCI STATE #2     TCI STATE #3

(51) Int. Cl.
　　*H04W 72/0453*　　　(2023.01)
　　*H04W 72/232*　　　 (2023.01)
　　*H04W 72/566*　　　 (2023.01)

(56)　　　　　References Cited

U.S. PATENT DOCUMENTS

| | | | | | |
|---|---|---|---|---|---|
| 2020/0169991 | A1* | 5/2020 | Lin | .................. | H04W 72/56 |
| 2020/0221485 | A1* | 7/2020 | Cirik | .................. | H04L 5/0048 |
| 2020/0351892 | A1* | 11/2020 | Yi | .................. | H04W 72/53 |
| 2021/0050955 | A1* | 2/2021 | Park | .................. | H04B 7/0456 |
| 2021/0168779 | A1* | 6/2021 | Mondal | .................. | H04L 5/0053 |
| 2022/0070704 | A1* | 3/2022 | Khoshnevisan | .................. | H04W 72/56 |
| 2022/0077982 | A1* | 3/2022 | Zhang | .................. | H04L 5/0053 |
| 2022/0131672 | A1* | 4/2022 | Jang | .................. | H04W 72/23 |
| 2022/0174681 | A1* | 6/2022 | Gao | .................. | H04W 72/563 |
| 2022/0209904 | A1* | 6/2022 | Jang | .................. | H04L 27/26025 |
| 2022/0232403 | A1* | 7/2022 | Lee | .................. | H04W 24/08 |
| 2022/0272556 | A1* | 8/2022 | Seo | .................. | H04L 5/0053 |
| 2022/0295457 | A1* | 9/2022 | Jang | .................. | H04L 5/0053 |
| 2022/0312380 | A1* | 9/2022 | Chen | .................. | H04W 72/02 |
| 2022/0312485 | A1* | 9/2022 | Zhang | .................. | H04B 7/06956 |
| 2022/0329387 | A1* | 10/2022 | Cirik | .................. | H04L 5/0053 |
| 2023/0076897 | A1* | 3/2023 | Svedman | .................. | H04L 5/0053 |
| 2023/0180229 | A1* | 6/2023 | Zhang | .................. | H04W 72/566 370/329 |
| 2023/0189264 | A1* | 6/2023 | Choi | .................. | H04W 72/1273 370/329 |
| 2023/0299918 | A1* | 9/2023 | Song | .................. | H04L 5/0053 370/329 |
| 2023/0413081 | A1* | 12/2023 | Zhang | .................. | H04L 5/0035 |
| 2024/0196399 | A1* | 6/2024 | Wang | .................. | H04L 5/0094 |
| 2024/0205711 | A1* | 6/2024 | Seo | .................. | H04W 56/001 |

OTHER PUBLICATIONS

International Search Report issued in PCT/JP2021/014368 on Nov. 16, 2021 (5 pages).
Written Opinion of the International Searching Authority issued in PCT/JP2021/014368 on Nov. 16, 2021 (5 pages).

\* cited by examiner

CORESET#X

CORESET#Y'

CORESET#X

CORESET#Y

CORESET#X

TCI STATE #1          TCI STATE #4

CORESET#Y'

TCI STATE #2          TCI STATE #3

CORESET#X

CORESET#Y' '

CORESET#X

CORESET#Y

CORESET#X

CORESET#Y '

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In specifications of Rel-15/16 NR thus far, in a case in which a plurality of channels/signals collide, in order to ensure that the plurality of channels/signals correspond to the same quasi-co-location (QCL) type D or to avoid such a case, restrictions (which may be referred to as priority rules) are defined.

For NR, a scheme in which one or a plurality of transmission/reception points (TRPs) (multi-TRP (MTRP)) perform DL transmission to a user terminal (User Equipment (UE)) has been under study. A scheme in which a UE performs UL transmission to one or a plurality of TRPs has also been under study.

For Rel-17 NR, support of simultaneous reception of a plurality of channels/signals of QCL type D in the UE has also been under study. However, control of collision of downlink control channels when the UE can simultaneously receive a plurality of channels/signals of QCL type D has not yet been under study. For example, when monitoring occasions of a plurality of control resource sets (CORESETs) overlap, how to control monitoring of the downlink control channels (Physical Downlink Control Channels (PDCCHs)) in the CORESETs has not yet been under study. Unless this is studied, transmission/reception by the UE may be inappropriately limited, and this may deteriorate throughput or deteriorate communication quality.

In view of this, the present disclosure has one object to provide a terminal, a radio communication method, and a base station that can appropriately address collision of a plurality of downlink control channels.

Solution to Problem

A terminal according to one aspect of the present disclosure includes: a control section that determines a first control resource set (CORESET) to be preferentially monitored out of a plurality of CORESETs, based on a rule; and a receiving section that, when monitoring occasions of the first CORESET having one or more transmission configuration indication states (TCI states) and a second CORESET having one or more TCI states overlap, controls monitoring of a downlink control channel (Physical Downlink Control Channel (PDCCH)) in the second CORESET, based on the one or more TCI states of the first CORESET and the one or more TCI states of the second CORESET.

Advantageous Effects of Invention

According to one aspect of the present disclosure, collision of a plurality of downlink control channels can be appropriately addressed.

DESCRIPTION OF EMBODIMENTS

TCI, Spatial Relation, QCL

Figure 1:
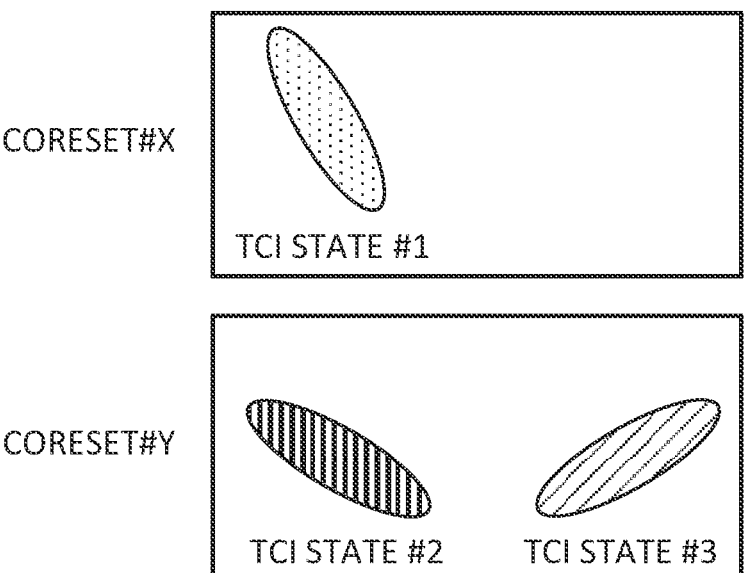
FIG. 1 is a diagram to show an example in which a TCI state of a prioritized CORESET and two TCI states of another CORESET are different.

For NR, control of reception processing (for example, at least one of reception, demapping, demodulation, and decoding) and transmission processing (for example, at least one of transmission, mapping, precoding, modulation, and coding) in a UE regarding at least one of a signal and a channel (expressed as a signal/channel), based on a transmission configuration indication state (TCI state), has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (that is, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

As the MAC signaling, for example, a MAC control element (MAC CE), a MAC Protocol Data Unit (PDU), or the like may be used. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that the channel/signal as the target of application of the TCI state may be referred to as a target channel/reference signal (RS) or simply as a target or the like, and another signal described above may be referred to as a reference reference signal (reference RS) and a source RS or simply as a reference or the like.

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

An RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), a reference signal for QCL detection (also referred to as a QRS), a demodulation reference signal (DMRS), and the like.

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The RS for QCL type X for the TCI state may mean the RS in the QCL type X relation with (the DMRS for) a certain channel/signal, and the RS may be referred to as a QCL source of the QCL type X for the TCI state.

Collision of Plurality of Channels/Signals

In specifications of Rel-15/16 NR thus far, the UE can receive, detect, or monitor only channels/signals of the same QCL type D in the same time, but cannot receive, detect, or monitor a plurality of channels/signals of different QCL types D in the same time. Thus, in a case in which a plurality of channels/signals collide (i.e., are transmitted/received in overlapping time), in order to ensure that the plurality of channels/signals correspond to the same QCL type D or to avoid such a case, restrictions (which may be referred to as priority rules, QCL application rules, or the like) as described later are defined in the specifications of Rel-15/16 NR.

Note that, in the present disclosure, a case in which a plurality of channels/signals collide may mean that reception (or transmission) of a plurality of channels/signals of different QCL types D in the same time resources (time period) is scheduled (or configured).

In the present disclosure, a case in which (a reference RS of) QCL type D of a certain channel/signal and (a reference RS of) QCL type D of another channel/signal are different may mean that a beam used for communication of the certain channel/signal and a beam used for communication of such another channel/signal are different. In the present disclosure, a case in which (a reference RS of) QCL type D of a certain channel/signal and (a reference RS of) QCL type D of another channel/signal are different may be described as a case in which QCL types D of the certain channel/signal and such another channel/signal are different, these QCL type D properties are different, "QCL types D" are different, or the like.

<PDCCH vs. PDCCH>

When the UE is configured with single cell operation or configured with operation of carrier aggregation in the same frequency band and monitors PDCCH candidates in overlapping monitoring occasions in a plurality of CORESETs having the same or different QCL type D property in an active DL BWP of one or more cells, the UE monitors a PDCCH in, among the plurality of CORESETs, only a certain CORESET and a CORESET having the same QCL type D property as the certain CORESET.

The "certain CORESET" corresponds to, if any, a common search space (CSS) set having the minimum index in a cell having the minimum index including a CSS set, otherwise, the "certain CORESET" corresponds to a UE-specific search space (USS) set having the minimum index in the cell having the minimum index. The minimum USS set index is determined over all of the USS sets having at least one PDCCH candidate in the overlapping PDCCH monitoring occasions.

In brief, when the UE monitors PDCCH candidates in overlapping monitoring occasions, the UE determines a CORESET to be monitored in accordance with a priority rule that a CSS set is preferentially monitored over a USS set, and that, among SS sets of the same type (CSS or USS), an SS set having a smaller index (that is, an SS set having a smaller cell index; an SS set having a smaller SS set index when the SS sets have the same cell index) is preferentially monitored.

Note that the SS set index may correspond to a value configured with an RRC parameter SearchSpaceId for identifying a search space. Note that, in the present disclosure, a CSS set index may mean an SS set index regarding an SS set whose search space type (RRC parameter "searchSpaceType") indicates the CSS. In the present disclosure, a USS set index may mean an SS set index regarding an SS set whose search space type (RRC parameter "searchSpaceType") indicates the USS.

Multi-TRP

Incidentally, for NR, a scheme in which one or a plurality of transmission/reception points (TRPs) (multi-TRP (MTRP)) perform DL transmission to a UE has been under study. A scheme in which a UE performs UL transmission to one or a plurality of TRPs has also been under study.

In Rel. 17 or later versions, it is also assumed that repetition transmission (PDCCH repetition) is applied to a PDCCH (or DCI) transmitted from one or more TRPs. For example, it is considered that scheduling or transmission and reception indication for one or more signals/channels is performed using a plurality of PDCCHs (or pieces of DCI) transmitted from one or more TRPs.

The PDCCHs/DCI to which the repetition transmission is applied may be referred to as multi-PDCCH/multi-DCI. The PDCCH repetition transmission may be interchangeably interpreted as PDCCH repetition, a plurality of transmissions of the PDCCH, multi-PDCCH transmission or multiple PDCCH transmissions, an MTR PDCCH, or the like.

The multi-PDCCH/multi-DCI may be transmitted from respective different TRPs. The multi-PDCCH/DCI may be multiplexed using time division multiplexing (TDM)/frequency division multiplexing (FDM)/space division multiplexing (SDM).

For example, when PDCCH repetition using TDM (TDM PDCCH repetition) is performed, the PDCCH may be transmitted using different time resources from a plurality of TRPs.

When FDM PDCCH repetition is performed, the PDCCH may be transmitted using different frequency time resources from a plurality of TRPs. In FDM PDCCH repetition, at least one of two sets of resource element groups (REGs), a control channel element (CCE) of the PDCCH to be transmitted, two PDCCH repetitions to be transmitted that do not overlap with respect to frequencies, and multi-chance PDCCHs to be transmitted that do not overlap with respect to frequencies may relate to different TCI states.

When SDM PDCCH repetition is performed, the PDCCH may be transmitted using the same time/frequency resources from a plurality of TRPs. In SDM PDCCH repetition, PDCCH DMRSs in all of the REGs/CCEs of the PDCCH may relate to two TCI states. Note that, in the present disclosure, SDM may be interchangeably interpreted as a single frequency network (SFN).

The UE to which FDM/SDM PDCCH repetition is applied is to be able to simultaneously receive a plurality of beams (a plurality of channels/signals of QCL type D). However, whether control of collision of the PDCCHs when the UE can simultaneously receive a plurality of beams (a plurality of channels/signals of QCL type D) is to follow the restrictions (priority rules) described above has not yet been under study. For example, when monitoring occasions of a plurality of CORESETs overlap, how to control monitoring of the PDCCHs in the CORESETs has not yet been under study. Unless this is studied, transmission/reception by the UE may be inappropriately limited, and this may deteriorate throughput or deteriorate communication quality.

In view of this, the inventors of the present invention came up with the idea of control that can appropriately address collision of a plurality of PDCCHs.

Embodiments according to the present disclosure will be described in detail with reference to the drawings as follows. The radio communication methods according to respective embodiments may each be employed individually, or may be employed in combination.

Note that, in the present disclosure, "A/B" may mean "at least one of A and B".

In the present disclosure, activate, deactivate, indicate, select, configure, update, determine, and the like may be interchangeably interpreted.

In the present disclosure, RRC, an RRC parameter, an RRC message, a higher layer parameter, an information element (IE), and configuration may be interchangeably interpreted. In the present disclosure, a MAC CE, an update command, and an activation/deactivation command may be interchangeably interpreted. In the present disclosure, to support, to control, to be able to control, to operate, and to be able to operate may be interchangeably interpreted.

In the present disclosure, a sequence, a list, a set, a group, and the like may be interchangeably interpreted.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), a certain resource (for example, a certain reference signal resource), a certain resource set (for example, a certain reference signal resource set), a CORESET pool, a PUCCH group (PUCCH resource group), a spatial relation group, a downlink TCI state (DL TCI state), an uplink TCI state (UL TCI state), a unified TCI state, an active TCI state, and the like may be interchangeably interpreted.

The panel may relate to at least one of a group index of an SSB/CSI-RS group, a group index of a group-based beam report, and a group index of an SSB/CSI-RS group for a group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, an index, an ID, an indicator, and a resource ID may be interchangeably interpreted. In the present disclosure, a sequence, a list, a set, a group, a group, a cluster, a subset, and the like may be interchangeably interpreted.

In the present disclosure, it may be assumed that a single PDCCH is supported when the multi-TRP uses an ideal backhaul. It may be assumed that the multi-PDCCH is supported when the multi-TRP uses a non-ideal backhaul.

Note that the ideal backhaul may be referred to as DMRS port group type 1, reference signal related group type 1, antenna port group type 1, CORESET pool type 1, or the like. The non-ideal backhaul may be referred to as DMRS port group type 2, reference signal related group type 2, antenna port group type 2, CORESET pool type 2, or the like. Terms are not limited to these.

In the present disclosure, a multi-TRP, a multi-TRP system, multi-TRP transmission, and a multi-PDSCH may be interchangeably interpreted.

In the present disclosure, single DCI (sDCI), a single PDCCH, a multi-TRP system based on single DCI, an sDCI-based MTRP, and activation of two TCI states on at least one TCI code point may be interchangeably interpreted.

In the present disclosure, multi-DCI (mDCI), a multi-PDCCH, a multi-TRP system based on multi-DCI, an mDCI-based MTRP, and configuration of two CORESET pool indices or CORESET pool index=1 (or one or more values) may be interchangeably interpreted.

QCL in the present disclosure may be interchangeably interpreted as QCL type D.

Note that description will be given based on an assumption that the following embodiments are applied to a case in which the UE supports simultaneous reception of two or more channels/signals of different QCL types D, but the embodiments may be applied to other cases.

"TCI state A is of the same QCL type D as TCI state B", "TCI state A corresponds to a reference signal of the same QCL type D as TCI state B", "TCI state A is the same as TCI state B", "TCI state A is of QCL type D with TCI state B", and the like in the present disclosure may be interchangeably interpreted.

In the present disclosure, overlapping of monitoring occasions may mean overlapping of time/frequency resources of the monitoring occasions.

Radio Communication Method

In the present disclosure, the UE determines a first CORESET (prioritized CORESET) to be preferentially monitored out of a plurality of CORESETs, based on one of the following priority rules. Then, when the monitoring occasions of the first CORESET having one or more TCI states and a second CORESET (another CORESET) having one or more TCI states overlap, the UE controls monitoring (determines whether to perform monitoring) of the PDCCH in the second CORESET, based on the TCI state(s) of the first CORESET and the TCI state(s) of the second CORESET. The control will be described in each embodiment.

<Priority Rules>

The priority rules in the present disclosure will be described. The UE may determine a prioritized CORESET out of a plurality of CORESETs, based on one of the following first to third priority rules. An SFN PDCCH repetition scheme may be applied to PDCCH transmission of the present disclosure.

In the present disclosure, two or more TCI states may be activated for each CORESET. Activation of the TCI states for the CORESET may be notified to the UE using a MAC CE.

In the present disclosure, the CORESET to be monitored determined based on the priority rule is also simply referred to as a "prioritized CORESET", a CORESET of the highest priority, or the like. The prioritized CORESET may be a CORESET to be preferentially monitored.

[First Priority Rule]

A first priority rule is the same as that of Rel-16 NR. In other words, the UE determines the prioritized CORESET in accordance with the priority rule that a CSS set is preferentially monitored over a USS set, and that, among SS sets of the same type (CSS or USS), an SS set having a smaller index (that is, an SS set having a smaller cell index; an SS set having a smaller SS set index when the SS sets have the same cell index) is preferentially monitored.

[Second Priority Rule]

A second priority rule is as follows:

Step 1: If there is a subset of CORESETs having two active TCI states out of the colliding CORESETs, the priority rule of Rel-16 NR is applied to only the subset of CORESETs. If the prioritized CORESET is detected, the step ends. Otherwise, the step proceeds to step 2.

Step 2: If the prioritized CORESET is not detected in step 1, the priority rule of Rel-16 NR is applied to only a subset of CORESETs having one active TCI state out of the colliding CORESETs.

In other words, in the second priority rule, the UE determines the prioritized CORESET in accordance with the priority rule that the CORESET to be preferentially monitored is determined in order of the CSS set having two active TCI states>the USS set having two active TCI states>the CSS set having one active TCI state>the USS set having one active TCI state.

Note that, among SS sets of the same type (CSS or USS) having the same number of active TCI states, an SS set having a smaller index (that is, an SS set having a smaller cell index; an SS set having a smaller SS set index when the SS sets have the same cell index) is selected as the prioritized CORESET.

[Third Priority Rule]

A third priority rule is as follows:

Step 1: If there is a CORESET having two active TCI states and corresponding to the CSS set having the minimum index in a cell having the minimum index including the CSS set out of the colliding CORESETs, the CORESET is determined as the prioritized CORESET, and the step ends. Otherwise, the step proceeds to step 2.

Step 2: If there is a CORESET having one active TCI state and corresponding to the CSS set having the minimum index in a cell having the minimum index including the CSS set out of the colliding CORESETs, the CORESET is determined as the prioritized CORESET, and the step ends. Otherwise, the step proceeds to step 3.

Step 3: If there is a CORESET having two active TCI states and corresponding to the USS set having the minimum index in a cell having the minimum index including the USS set out of the colliding CORESETs, the CORESET is determined as the prioritized CORESET, and the step ends. Otherwise, the step proceeds to step 4.

Step 4: If there is a CORESET having one active TCI state and corresponding to the USS set having the minimum index in a cell having the minimum index including the USS set out of the colliding CORESETs, the CORESET is determined as the prioritized CORESET, and the step ends.

In other words, in the third priority rule, the UE determines the prioritized CORESET in accordance with the priority rule that the CORESET to be preferentially monitored is determined in order of the CSS set having two active TCI states>the CSS set having one active TCI state>the USS set having two active TCI states>the USS set having one active TCI state.

Note that, among SS sets of the same type (CSS or USS) having the same number of active TCI states, an SS set having a smaller index (that is, an SS set having a smaller cell index; an SS set having a smaller SS set index when the SS sets have the same cell index) is selected as the prioritized CORESET.

First Embodiment

When the monitoring occasions of the PDCCHs with different QCL types D overlap, for example, the following two cases are considered as to how to control collision of the PDCCHs. As an example, processing when the monitoring occasions of CORESET #1 and CORESET #2 overlap will be described.

Case 1-1: CORESET #1 has two TCI states (TCI #1 and TCI #2), and CORESET #2 has one TCI state (TCI #1).

Case 1-2: CORESET #1 has two TCI states (TCI #1 and TCI #2), and CORESET #2 has one TCI state (TCI #3).

When the first priority rule is applied, only the CORESET having the same TCI state (QCL type D) as the prioritized CORESET may be monitored. Thus, in case 1, when CORESET #2 is the prioritized CORESET, whether CORESET #1 can be monitored presents a problem. For example, when one of the TCI states of a certain CORESET is the same TCI state as the prioritized CORESET, a new rule that the certain CORESET is monitored may be applied.

Regarding case 1, the following plurality of options are considered.

(1) When CORESET #1 is the prioritized CORESET, CORESET #2 is monitored.

(2) When CORESET #2 is the prioritized CORESET, one of the following 2-1 to 2-3 is applied.

(2-1) CORESET #1 is not monitored.

(2-2) Only TCI #1 of CORESET #1 is monitored.

(2-3) Both of TCI #1 and TCI #2 of CORESET #1 are monitored.

In case 2, when CORESET #2 is the prioritized CORESET, CORESET #1 need not be monitored. When CORESET #1 is the prioritized CORESET, CORESET #2 need not be monitored.

Second Embodiment

The prioritized CORESET of a second embodiment is a prioritized CORESET that is determined based on one of the first to third priority rules and has one active TCI state. The following two cases may be applied to the PDCCH (PDCCH candidate) whose monitoring occasion overlaps that of the prioritized CORESET and that is monitored in another CORESET having two active TCI states.

[Case 2-1]

When one TCI state of the prioritized CORESET (CORESET X) and two TCI states of another CORESET (CORESET Y) are all different, the UE need not monitor the PDCCH in such another CORESET (see FIG. 1). In the example of FIG. 1, the monitoring occasions of CORESET X and CORESET Y overlap. In the example of FIG. 1, TCI state #1 of CORESET X and TCI states #2 and #3 of CORESET Y are different, and thus the UE need not monitor the PDCCH in CORESET Y.

[Case 2-2]

Figure 2:
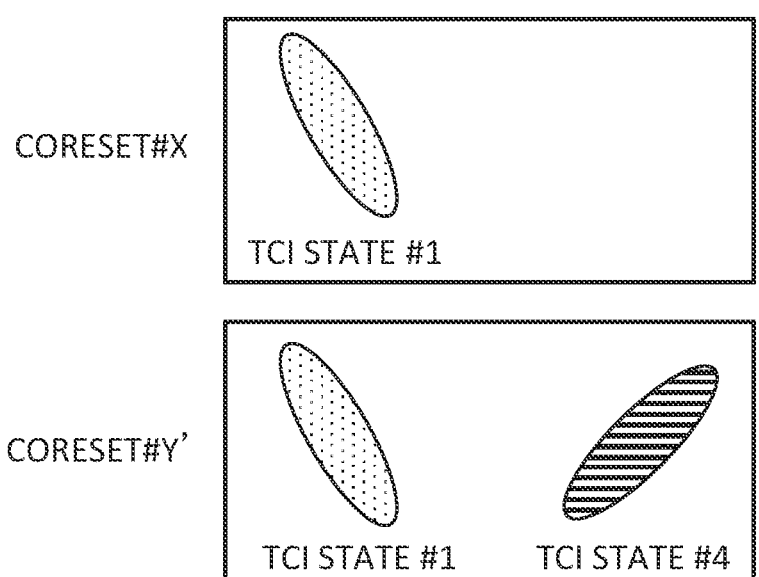
FIG. 2 is a diagram to show an example in which a TCI state of a prioritized CORESET and one of two TCI states of another CORESET are the same.

When one TCI state of the prioritized CORESET (CORESET X) and one of two TCI states of another CORESET (CORESET Y') are the same, one of the following options 2-2-1 to 2-2-3 is applied (see FIG. 2). In the example of FIG. 2, the monitoring occasions of CORESET X and CORESET Y' overlap.

[[Option 2-2-1]]

The UE may monitor the PDCCH only in another CORESET (CORESET Y') having the same TCI state as the TCI state of the prioritized CORESET (CORESET X). In the example of FIG. 2, the UE monitors the PDCCH using (based on) TCI state #1 in CORESET Y', but does not monitor the PDCCH using TCI state #4.

[[Option 2-2-2]]

The UE does not monitor the PDCCH in another CORESET (CORESET Y'), regardless of the TCI state. In the example of FIG. 2, the UE does not monitor the PDCCH in CORESET Y' corresponding to both of TCI state #1 and TCI state #4.

[[Option 2-2-3]]

The UE monitors the PDCCH in another CORESET (CORESET Y'), regardless of the TCI state. In the example of FIG. 2, the UE monitors the PDCCH in CORESET Y' corresponding to both of TCI state #1 and TCI state #4.

Note that, when a first TCI state (or a second TCI state) of another CORESET (CORESET Y') is the same as the TCI state of the prioritized CORESET (CORESET X), one of options 2-2-1 to 2-2-3 above may be applied. The options (options 2-2-1 to 2-2-3 above) to be applied may be different between a case in which the first TCI state of such another CORESET (CORESET Y') is the same as the TCI state of the prioritized CORESET (CORESET X) and a case in which the second TCI state of such another CORESET (CORESET Y') is the same as the TCI state of the prioritized CORESET (CORESET X).

Note that the first TCI state (or the second TCI state) corresponds to TCI state #1 of CORESET Y' in FIG. 2. For example, the first TCI state may be a TCI state having an ID lower (or higher) than that of the second TCI state.

According to the present embodiment, when the monitoring occasions of the prioritized CORESET having one TCI state and another CORESET having two TCI states overlap, monitoring of the PDCCH can be appropriately controlled.

Third Embodiment

The prioritized CORESET of a third embodiment is a prioritized CORESET that is determined based on one of the first to third priority rules and has two active TCI states. The following three cases may be applied to the PDCCH (PDCCH candidate) whose monitoring occasion overlaps that of the prioritized CORESET and that is monitored in another CORESET having two active TCI states.

[Case 3-1]

Figure 3:
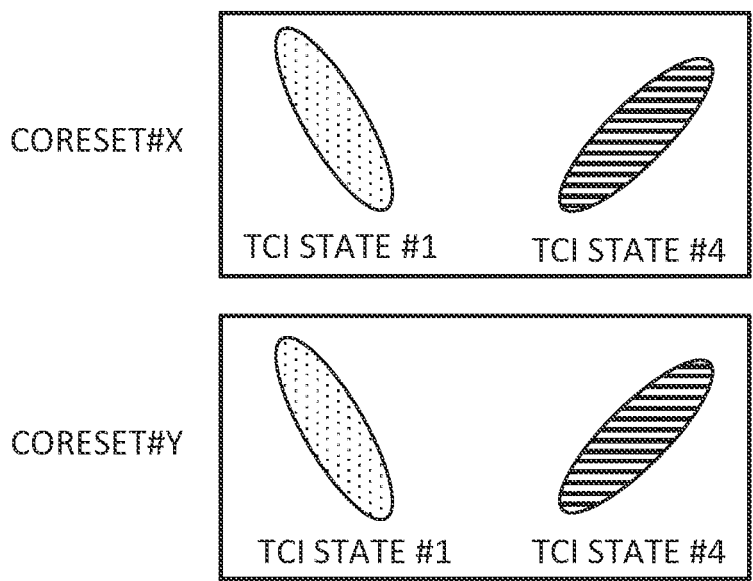
FIG. 3 is a diagram to show an example in which two TCI states of a prioritized CORESET and two TCI states of another CORESET are the same.

When both of (two) TCI states of the prioritized CORE-SET (CORESET X) and both of (two) TCI states of another CORESET (CORESET Y) are the same, the UE may monitor the PDCCH in such another CORESET (CORESET Y) (see FIG. 3). In the example of FIG. 3, the monitoring occasions of CORESET X and CORESET Y overlap. In the example of FIG. 3, for the UE, the two TCI states of CORESET X and the two TCI states of CORESET Y are both the same (TCI states #1 and #4), and thus the UE monitors the PDCCH in CORESET Y.

[Case 3-2]

Figure 4:
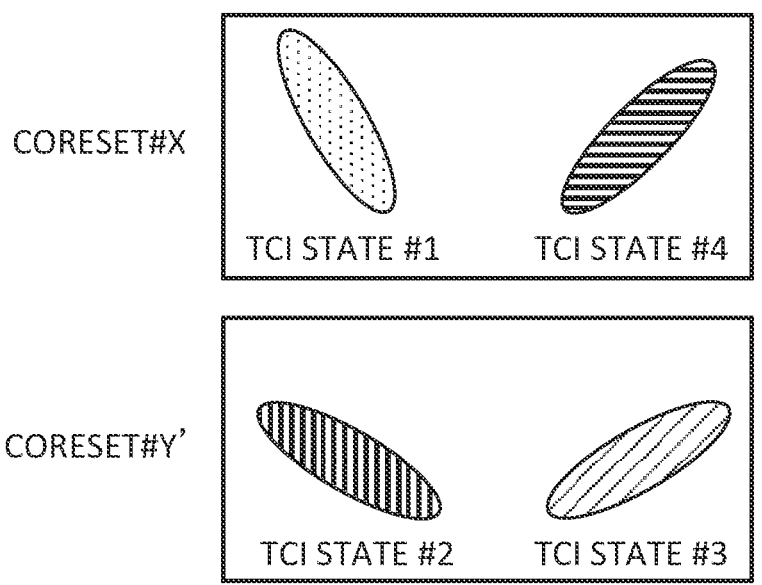
FIG. 4 is a diagram to show an example in which two TCI states of a prioritized CORESET and two TCI states of another CORESET are all different.

When both of (two) TCI states of the prioritized CORE-SET (CORESET X) and both of (two) TCI states of another CORESET (CORESET Y') are all different, the UE need not monitor the PDCCH in such another CORESET (CORESET Y') (see FIG. 4). In the example of FIG. 4, the monitoring occasions of CORESET X and CORESET Y' overlap. In the example of FIG. 4, for the UE, the two TCI states (TCI states #1 and #4) of CORESET X and the two TCI states (TCI states #2 and #3) of CORESET Y' are all different, and thus the UE does not monitor the PDCCH in CORESET Y'.

[Case 3-3]

Figure 5:
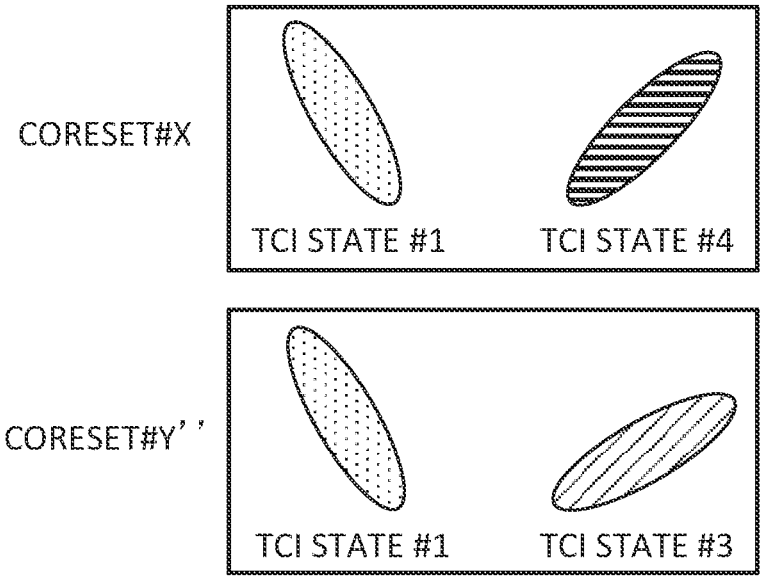
FIG. 5 is a diagram to show an example in which one of two TCI states of a prioritized CORESET and one of two TCI states of another CORESET are the same.

When one (TCI state #1) of two TCI states of the prioritized CORESET (CORESET X) and one (TCI state #1) of two TCI states of another CORESET (CORESET Y") are the same, one of the following options 3-3-1 and 3-3-2 is applied (see FIG. 5). In the example of FIG. 5, the monitoring occasions of CORESET X and CORESET Y" overlap.

[[Option 3-3-1]]

The UE may monitor the PDCCH only in another CORE-SET (CORESET Y") having the same TCI state as the TCI state of the prioritized CORESET (CORESET X). In the example of FIG. 5, the UE monitors the PDCCH using (based on) TCI state #1 in CORESET Y", and does not monitor the PDCCH using TCI state #3.

[[Option 3-3-2]]

The UE need not monitor the PDCCH in another CORE-SET (CORESET Y").

Note that option 3-3-1 or 3-3-2 above may be applied to the following cases of (1) to (4). For example, the first TCI state may be a TCI state having an ID lower (or higher) than that of the second TCI state. For each of the following cases of (1) to (4), which of options 3-3-1 and 3-3-2 above is applied may be different.

(1) A case in which the first TCI state of another CORE-SET (CORESET Y") is the same as the first TCI state of the prioritized CORESET (CORESET X).

(2) A case in which the second TCI state of another CORESET (CORESET Y") is the same as the second TCI state of the prioritized CORESET (CORESET X).

(3) A case in which the first TCI state of another CORE-SET (CORESET Y") is the same as the second TCI state of the prioritized CORESET (CORESET X).

(4) A case in which the second TCI state of another CORESET (CORESET Y") is the same as the first TCI state of the prioritized CORESET (CORESET X).

According to the present embodiment, when the monitoring occasions of the prioritized CORESET having two TCI states and another CORESET having two TCI states overlap, monitoring of the PDCCH can be appropriately controlled.

Fourth Embodiment

The prioritized CORESET of a fourth embodiment is a prioritized CORESET that is determined based on one of the first to third priority rules and has two active TCI states. The following two cases may be applied to the PDCCH (PDCCH candidate) whose monitoring occasion overlaps that of the prioritized CORESET and that is monitored in another CORESET having one active TCI state.

[Case 4-1]

Figure 6:
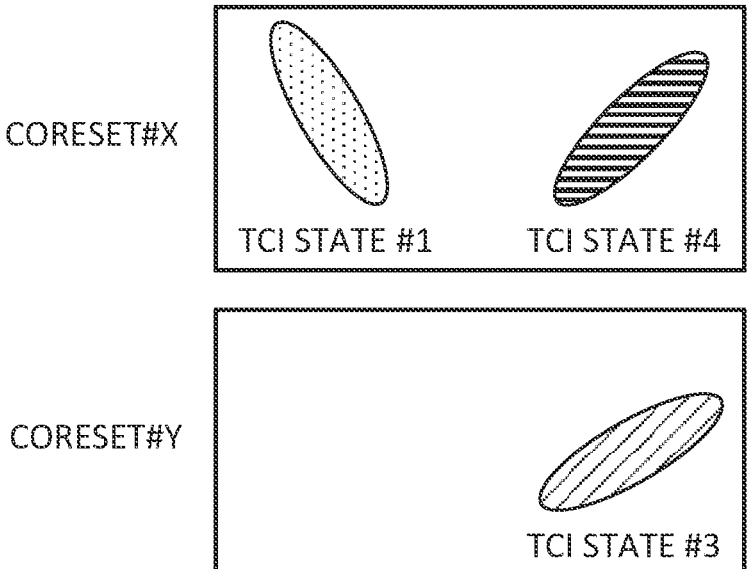
FIG. 6 is a diagram to show an example in which both of two TCI states of a prioritized CORESET and one TCI state of another CORESET are different.

When both of (two) TCI states of the prioritized CORE-SET (CORESET X) and one TCI state of another CORESET (CORESET Y) are different, the UE need not monitor the PDCCH in such another CORESET (CORESET Y) (see FIG. 6). In the example of FIG. 6, the monitoring occasions of CORESET X and CORESET Y overlap. In the example of FIG. 6, the two TCI states of CORESET X and the one TCI state of CORESET Y are different, and thus the UE does not monitor the PDCCH in CORESET Y.

[Case 4-2]

Figure 7:
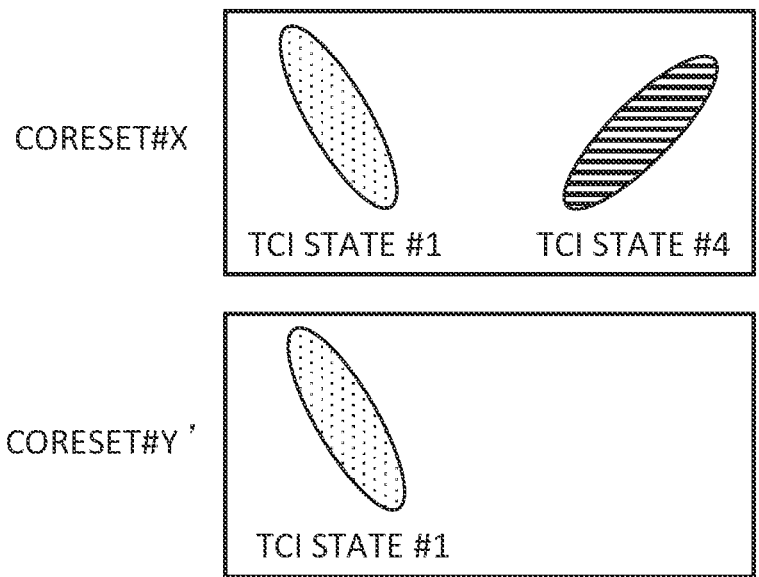
FIG. 7 is a diagram to show an example in which one of two TCI states of a prioritized CORESET and one TCI state of another CORESET are the same.

When one of two TCI states of the prioritized CORESET (CORESET X) and one TCI state of another CORESET (CORESET Y) are the same, one of the following options 4-2-1 and 4-2-2 is applied (see FIG. 7). In the example of FIG. 7, the monitoring occasions of CORESET X and CORESET Y' overlap. In the example of FIG. 7, one TCI state (TCI state #1) of CORESET Y' is the same as one (TCI state #1) of the two TCI states of CORESET X.

[[Option 4-2-1]]

The UE monitors the PDCCH in CORESET Y'.

[[Option 4-2-2]]

The UE does not monitor the PDCCH in CORESET Y'.

Note that option 4-2-1 or 4-2-2 above may be applied to the following case of (1) or (2). For example, the first TCI state may be a TCI state having an ID lower (or higher) than that of the second TCI state. For each of the following cases of (1) and (2), which of options 4-4-1 and 4-4-2 above is applied may be different.

(1) A case in which the TCI state of another CORESET (CORESET Y') is the same as the first TCI state of the prioritized CORESET (CORESET X).

(2) A case in which the TCI state of another CORESET (CORESET Y') is the same as the second TCI state of the prioritized CORESET (CORESET X).

According to the present embodiment, when the monitoring occasions of the prioritized CORESET having two TCI states and another CORESET having one TCI state overlap, monitoring of the PDCCH can be appropriately controlled.

<UE Capability>

Note that at least one of the embodiments described above may be applied only to a UE that has reported a specific UE capability or that supports the specific UE capability.

The specific UE capability may indicate at least one of the following:

Whether to support the SFN PDCCH repetition scheme,

Whether to support the SFN PDCCH repetition scheme for the CSS set,

Whether to support the SFN PDCCH repetition scheme for the USS set,

Whether to support simultaneous reception of two (or two or more) PDCCHs of different QCL types D.

At least one of the embodiments described above may be applied when the UE reports a corresponding UE capability or is configured with specific information related to the embodiment(s) described above using higher layer signaling (when not being configured, for example, operations of Rel. 15/16 are applied). For example, the specific information may be information indicating enabling of the SFN/FDM PDCCH repetition scheme, any RRC parameter for a specific release (for example, Rel. 17), or the like.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 8:
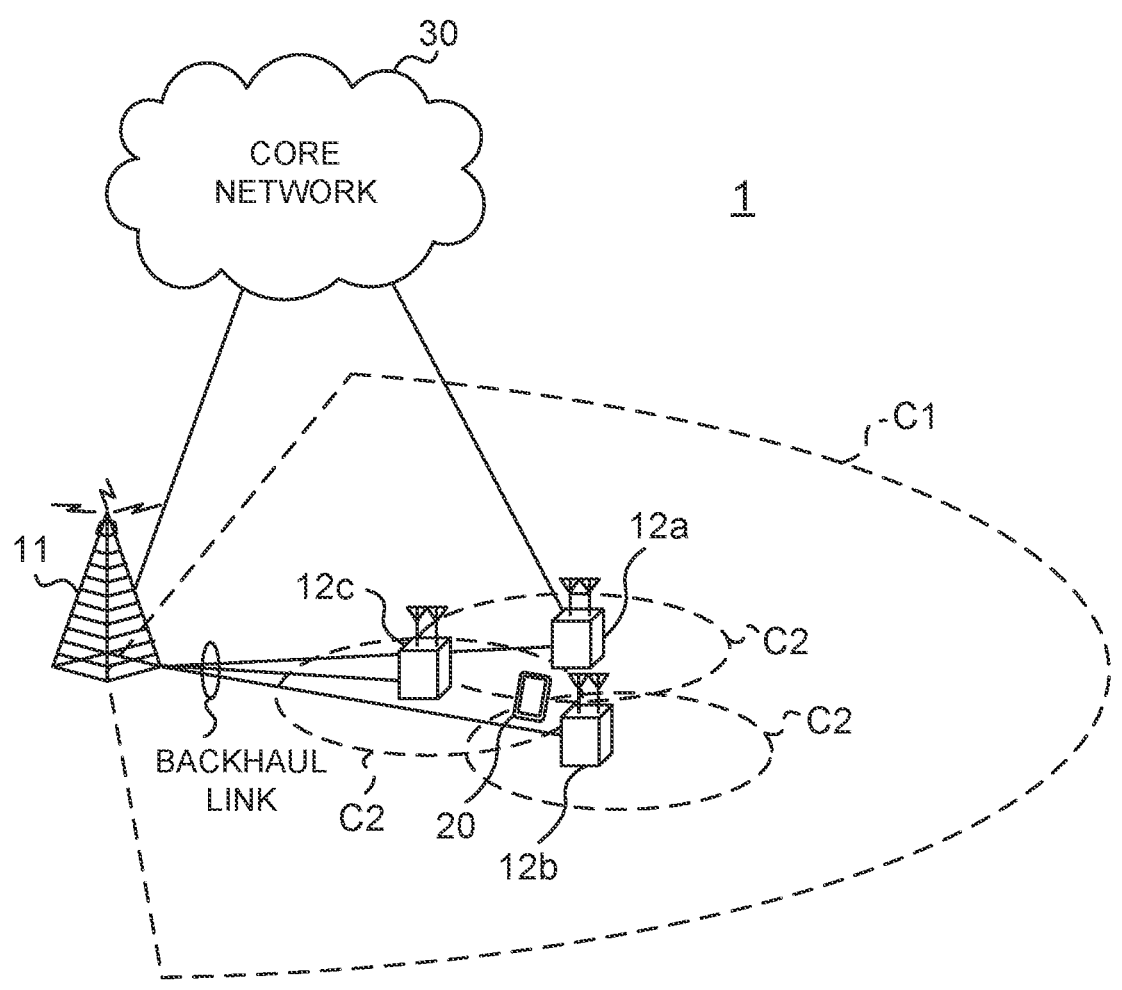
FIG. 8 is a diagram to show an example of a schematic structure of a radio communication system according to one embodiment.

FIG. 8 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a reference signal for measurement (Sounding Reference Signal (SRS)), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
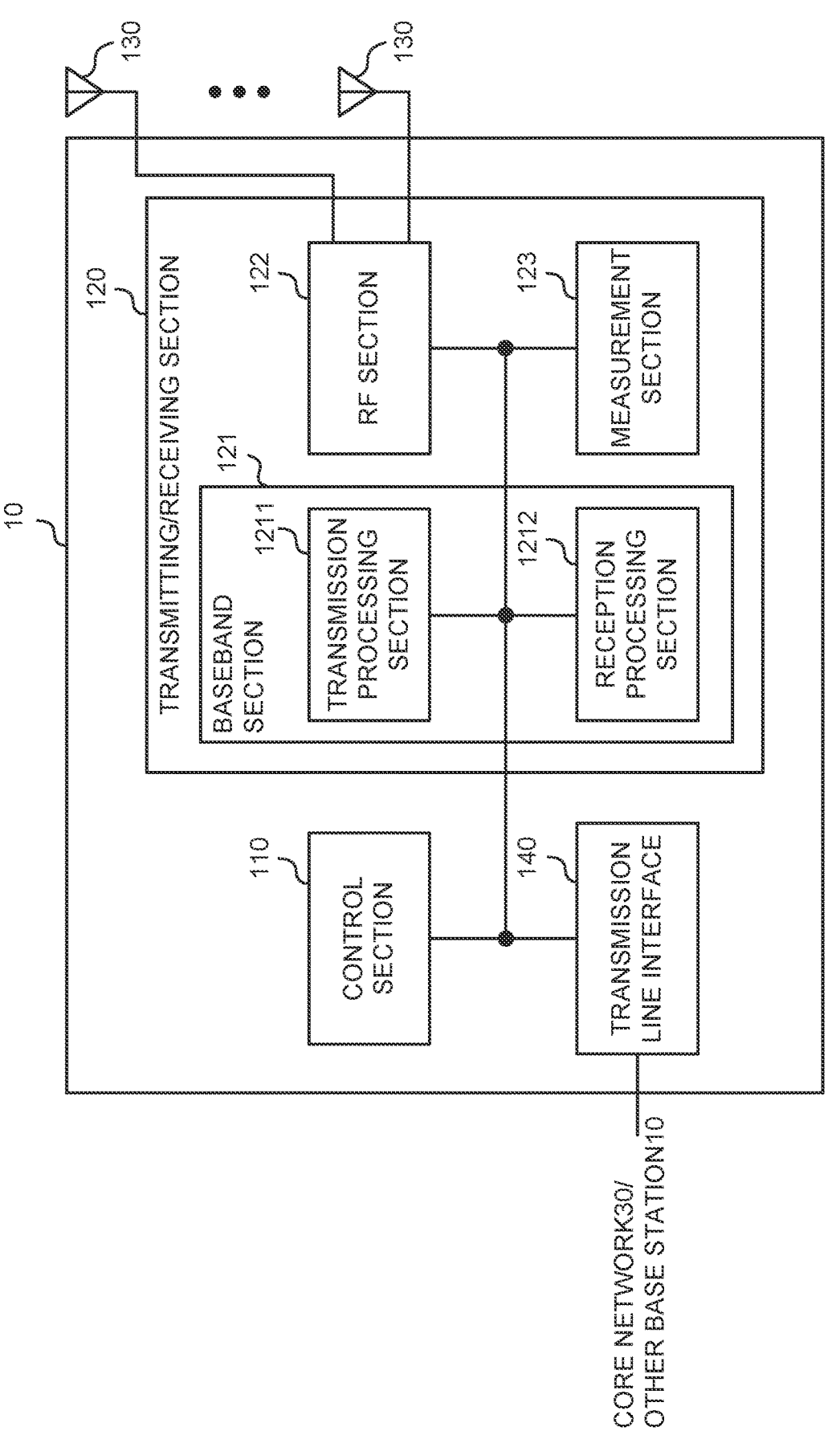
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a downlink control channel (PDCCH) for a first control resource set (CORESET) to be preferentially monitored out of a plurality of CORESETs, the first CORESET being determined based on a rule. The transmitting/receiving section 120 may, when monitoring occasions of the first CORESET having one or more transmission configuration indication states (TCI states) and a second CORESET having one or more TCI states overlap, transmit a PDCCH for the second CORESET, the PDCCH being subjected to monitoring control based on the one or more TCI states of the first CORESET and the one or more TCI states of the second CORESET.

The control section 110 may control transmission processing of the transmitting/receiving section 120.
(User Terminal)

Figure 10:
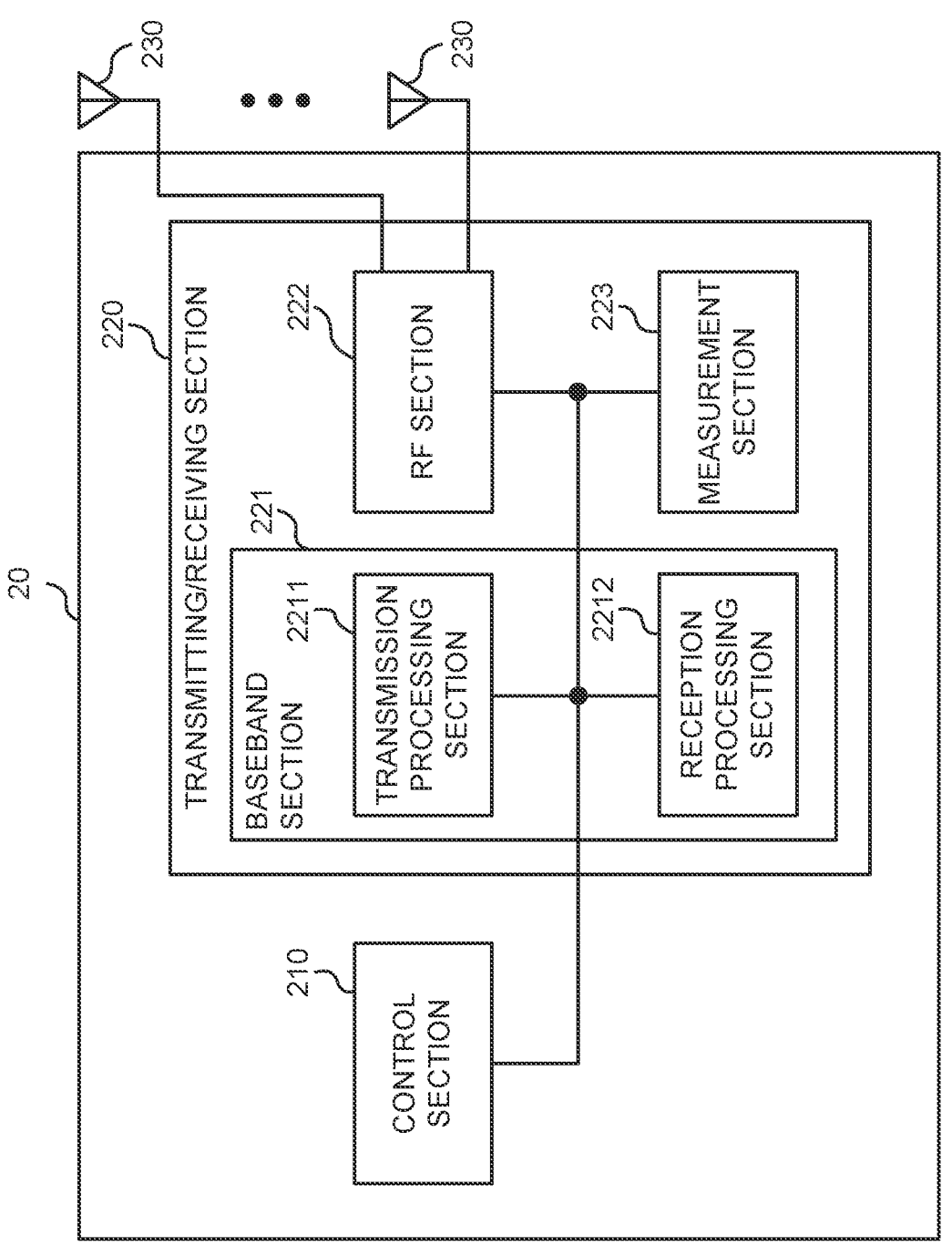
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may, when monitoring occasions of the first CORESET having one or more transmission configuration indication states (TCI states) and a second CORESET having one or more TCI states overlap, control monitoring of a downlink control channel (PDCCH) in the second CORESET, based on the one or more TCI states of the first CORESET and the one or more TCI states of the second CORESET.

When one TCI state of the first CORESET and one of two TCI states of the second CORESET are same, the transmitting/receiving section 220 may monitor the PDCCH by using a same TCI state as the one TCI state of the first CORESET, in the second CORESET.

When one of two TCI states of the first CORESET and one of two TCI states of the second CORESET are same, the transmitting/receiving section 220 may monitor the PDCCH by using a same TCI state as the one of the two TCI states of the first CORESET, in the second CORESET.

When one of two TCI states of the first CORESET and one TCI state of the second CORESET are same, the transmitting/receiving section 220 may monitor the PDCCH in the second CORESET.

The control section 210 may determine a first control resource set (CORESET) to be preferentially monitored out of a plurality of CORESETs, based on a rule.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
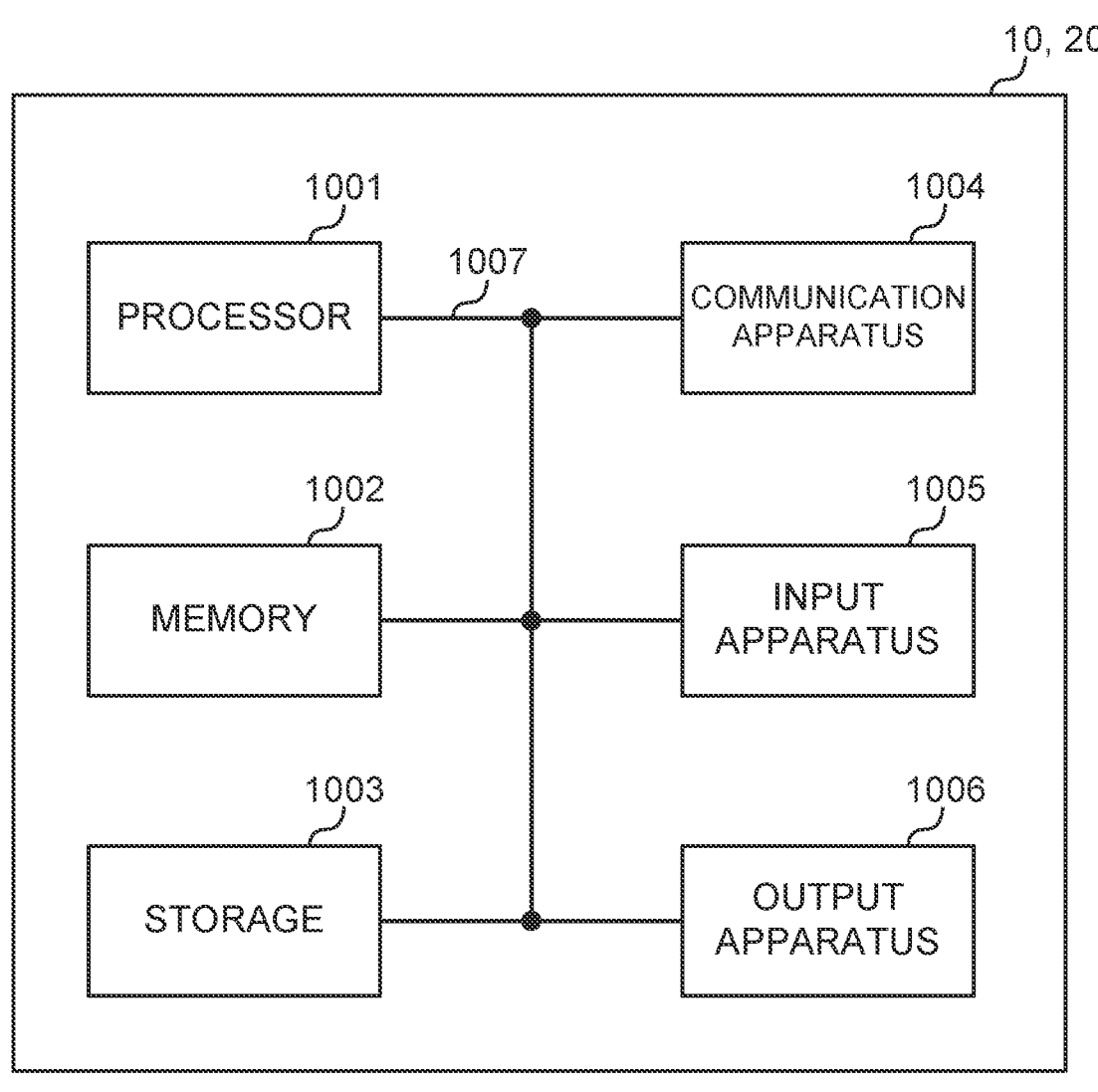
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be notified using, for example, MAC control elements (MAC CEs).

Also, notification of certain information (for example, notification of "being X") does not necessarily have to be notified explicitly, and can be notified implicitly (by, for example, not notifying this certain information or notifying another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a processor that determines a first control resource set (CORESET), among a plurality of CORESETs, with two or less activated transmission configuration indication (TCI) states used for monitoring a physical downlink control channel (PDCCH); and
a receiver that, when a monitoring occasion of the first CORESET with two activated TCI states overlaps a monitoring occasion of a second CORESET with two activated TCI states and when one of the two TCI states of the first CORESET has same quasi-co-location (QCL) as one of the two TCI states of the second CORESET, monitors the PDCCH in the second CORESET,
wherein when a monitoring occasion of the first CORESET with one activated TCI state overlaps a monitoring occasion of the second CORESET with two activated TCI states and when a QCL type D of the first CORESET is same as one of two QCL types D of the second CORESET, the receiver monitors the PDCCH in the second CORESET, and
the first CORESET is a CORESET corresponding to a common search space (CSS) set with a lowest index in a cell with the lowest index containing a CSS or a CORESET corresponding to a UE-specific search space (USS) set with a lowest index in a cell with the lowest index, and the CORESET corresponding to the CSS set is monitored with higher priority than the CORESET corresponding to the USS set.

2. The terminal according to claim 1, wherein when a monitoring occasion of the first CORESET with one activated TCI state overlaps a monitoring occasion of the second CORESET with two activated TCI states and when the TCI state of the first CORESET has same quasi-co-location (QCL) as one of the two TCI states of the second CORESET, the receiver monitors the PDCCH in the second CORESET.

3. The terminal according to claim 1, wherein when a monitoring occasion of the first CORESET with two activated TCI states overlaps a monitoring occasion of the second CORESET with one activated TCI state and when one of the two TCI states of the first CORESET has same QCL as the TCI state of the second CORESET, the receiver monitors the PDCCH in the second CORESET.

4. A radio communication method for a terminal, comprising:
determining a first control resource set (CORESET), among a plurality of CORESETs, with two or less activated transmission configuration indication (TCI) states (TCI state) used for monitoring a physical downlink control channel (PDCCH); and when a monitoring occasion of the first CORESET with two activated TCI states overlaps a monitoring occasion of a second CORESET with two activated TCI states and when one of the two TCI states of the first CORESET has same quasi-co-location (QCL) as one of the two TCI states of the second CORESET, monitoring the PDCCH in the second CORESET, wherein when a monitoring occasion of the first CORESET with one activated TCI state overlaps a monitoring occasion of the second CORESET with two activated TCI states and when a QCL type D of the first CORESET is same as one of two QCL types D of the second CORESET, monitoring the PDCCH in the second CORESET, and the first CORESET is a CORESET corresponding to a common search space (CSS) set with a lowest index in a cell with the lowest index containing a CSS or a CORESET corresponding to a UE-specific search space (USS) set with a lowest index in a cell with the lowest index, and the CORESET corresponding to the CSS set is monitored with higher priority than the CORESET corresponding to the USS set.

5. A base station comprising:

a processor that controls transmission of a physical downlink control channel (PDCCH) for a first control resource set (CORESET) with two or less activated transmission configuration indication (TCI) states, the first CORESET being determined from a plurality of CORESETs; and a transmitter that transmits the PDCCH for a second CORESET, wherein when a monitoring occasion of the first CORESET with two activated TCI states overlaps a monitoring occasion of a second CORESET with two activated TCI states and when one of the two TCI states of the first CORESET has same quasi-co-location (QCL) as one of the two TCI states of the second CORESET, the PDCCH for the second CORESET is monitored in a terminal, when a monitoring occasion of the first CORESET with one activated TCI state overlaps a monitoring occasion of the second CORESET with two activated TCI states and when a QCL type D of the first CORESET is same as one of two QCL types D of the second CORESET, the PDCCH in the second CORESET is monitored in the terminal, and the first CORESET is a CORESET corresponding to a common search space (CSS) set with a lowest index in a cell with the lowest index containing a CSS or a CORESET corresponding to a UE-specific search space (USS) set with a lowest index in a cell with the lowest index, and the CORESET corresponding to the CSS set is monitored with higher priority than the CORESET corresponding to the USS set.

6. A system comprising a terminal and a base station, wherein the base station comprises:

a transmitter that transmits a physical downlink control channel (PDCCH), and the terminal comprises:

a processor that determines a first control resource set (CORESET), among a plurality of CORESETs, with two or less activated transmission configuration indication (TCI) states used for monitoring the PDCCH; and a receiver that, when a monitoring occasion of the first CORESET with two activated TCI states overlaps a monitoring occasion of a second CORESET with two activated TCI states and when one of the two TCI states of the first CORESET has same quasi-co-location (QCL) as one of the two TCI states of the second CORESET, monitors the PDCCH in the second CORESET, wherein when a monitoring occasion of the first CORESET with one activated TCI state overlaps a monitoring occasion of the second CORESET with two activated TCI states and when a QCL type D of the first CORESET is same as one of two QCL types D of the second CORESET, the receiver monitors the PDCCH in the second CORESET, and the first CORESET is a CORESET corresponding to a common search space (CSS) set with a lowest index in a cell with the lowest index containing a CSS or a CORESET corresponding to a UE-specific search space (USS) set with a lowest index in a cell with the lowest index, and the CORESET corresponding to the CSS set is monitored with higher priority than the CORESET corresponding to the USS set.

* * * * *